FERDINAND C. A. VON LEVETZOW.
Improvement in Flower-Pots.

No. 126,112.

Patented April 23, 1872.

Witnesses.

K. N. Jones
Geo. W. Miatt

Inventor:

Ferdinand Carl August von Levetzow
Per Burke, Fraser & Osgood, Att'ys

UNITED STATES PATENT OFFICE.

FERDINAND C. A. VON LEVETZOW, OF KIEL, PRUSSIA.

IMPROVEMENT IN FLOWER-POTS.

Specification forming part of Letters Patent No. 126,112, dated April 23, 1872.

*To all whom it may concern:*

Be it known that I, FERDINAND CARL AUGUST VON LEVETZOW, of Kiel, in the Kingdom of Prussia, have invented certain "Improvements in Flower-Pots," of which the following is a specification, reference being had to the annexed drawing making a part of the same.

Figure 1:
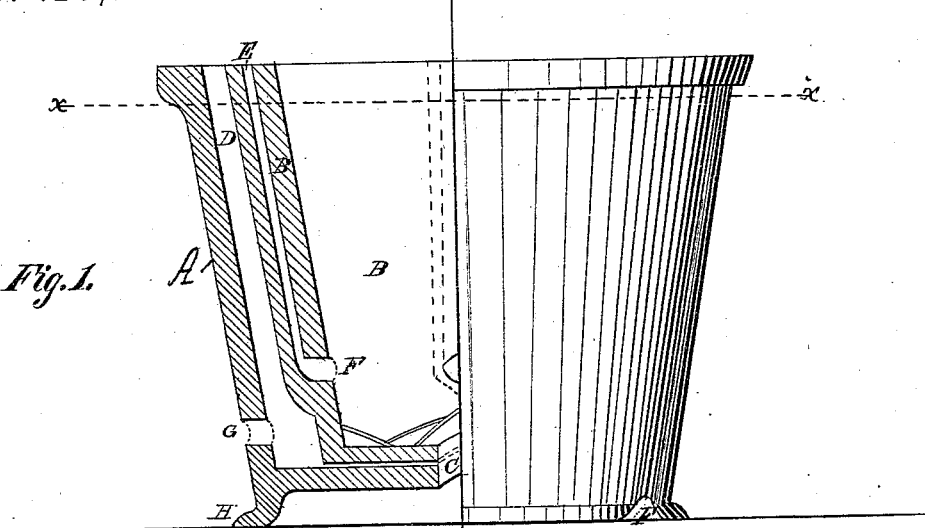
Figure 2:
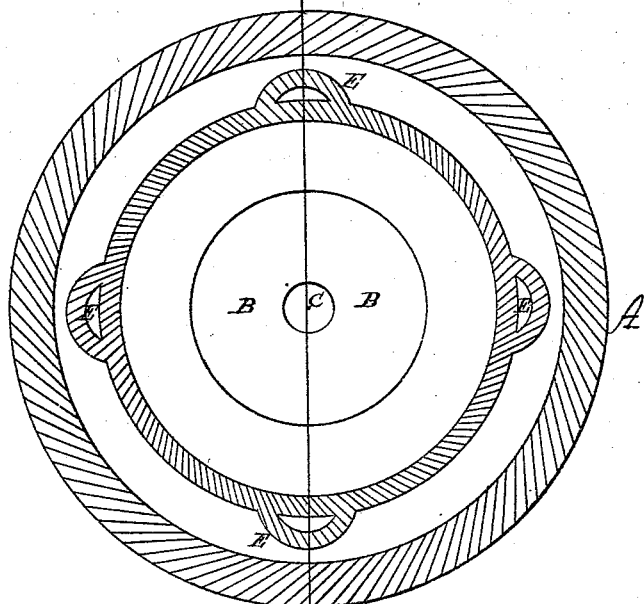

Figure 1 is a vertical transverse part section and front view of the said flower-pot. Fig. 2 is a sectional plan of the same at x x of Fig. 1.

The flower-pot B, destined to receive the plant, is so adjusted to the bottom of the second pot A—which is two inches wider in circumference—as to exclude all communication between the two. D, destined for the reception of water and the interior of the pot B and the outlet C in the mutual bottom, communicates only with the pot B. Four pipes, E F, pass through the space D formed round the walls of the pot B by the exterior pot A, which pipes, attached to the outer side of the pot B, terminate at the upper edge of the latter, and are open at either end. They communicate at F one-half or one inch above the bottom of the pot with the interior space of the pot B. G is an opening admitting of a cork, to let the water out of the space D. H is a projecting edge of the pot A, lest the outlet C should stand direct upon the flower-stand. The edge is supplied with a slope, T, to produce a circulation of air through F C F E. The exterior pot may be formed of any substance through which water will not penetrate. The flower-pot B must be made of baked clay.

The efficacy of the pot is chiefly dependent on the degree of porosity of the clay. The clay employed for the walls of the flower-pot B must not be so porous as to allow the inner side—the reservoir D being filled with water—to show a more than scarcely perceptible dampness, as if breathed upon. Any clay that allows a dampness to pass through so as to form drops, be it in ever so slight a degree, is not fit, as the earth will be perfectly soaked, and such clay can scarcely be reduced to the requisite degree of porosity by glaze. On the other hand, the penetration of a scarcely perceptible dampness is, although not absolutely necessary, yet very beneficial for the growth of the plants, and a sign of a good and practicable make. The clay for the pipes must be more porous, yet not in too high a degree. The clay must be so porous that the air inside the pipes ever remains damp, and that out of the lower opening of the pipes a slight precipitation is formed on the bottom of the flower-pot. This precipitation should be just sufficient to show a small drop of water in the lower opening of each pipe without there being a perceptible flow. Difficult as it may appear on first sight to regulate the degree of porosity, yet it may be easily produced with suitable clay.

The reservoir D, which must never be so full as to cause water to flow into the upper openings of the pipes, exhibits from the top an open level. The construction of the pot is considerably facilitated when the exterior pot and the flower-pot are each formed separately, and the latter subsequently connected to the bottom of the former by any perfectly water-proof cement.

To explain the purpose of the above construction, it will become necessary to describe, beforehand, the method of planting the flowers in the pot. The outlet C is covered by a very hollow fragment, and care must be taken to secure good drainage by hollow pieces of broken pots. On such drainage, straight before the lower openings F of the pipes, yet so loose as in no way to impair the circulation of air, is placed a layer one-half inch high, (in larger pots higher,) half of charcoal, half of animal charcoal. To meet any stoppage of the openings of the pipes by the soil—which is put in later—the charcoal is covered by turf, coarsely ground, fiber-like, but free from iron, and on the latter loose earth is scattered, not finely sifted, but specially adapted for the plant to be grown, as in the usual way, but without pressing too firmly. The construction of the pot and the mode of planting will fulfill for any flower thus inserted all the conditions requisite for a healthy and vigorous growth, to which plants growing in common pots can never attain.

These pots remove every obstacle, dust excepted, that otherwise impedes the healthy growth of plants in rooms, and they enable parties that are not initiated in horticulture to adorn their flower-stands with pretty and thriving plants. They finally offer persons who are frequently prevented by business from attending and nursing their flowers regularly, the inestimable advantage that they may at any time quit their plants without fearing any danger, and even if absent for months, safely confide them to the care of inexpert servants.

First, a fundamental condition of the thriving growth of a plant is free admission of air to the roots, which, in common pots, we try to bring about by very porous walls of the pots, and by occasionally loosening the surface of the earth. As a plant in my flower-pot is never watered from above, except in the event of vegetation not appearing to be strong enough, the earth, which is not compressed together by daily watering, will always retain a loose texture, and the admission of air through the loose soil, in connection with the pipes, which, moreover, always furnish the roots with a damp air, is so secured as can never be the case in common pots.

Second, by the evaporation from the reservoir the plant will ever be encircled in a moist atmosphere, and the dry room air thus subdued.

Third, the fine sucking roots at the sides of the pots cannot suffer, even on stands most exposed to a burning sun, as they are protected by the surrounding water or the exterior pot.

Fourth, plants that do not bear the soil being loosened on account of the fine tender roots crossing the surface of the soil, obtain the necessary air by the pipes at the roots.

The layer of charcoal before the pipes will suck up the damp air and precipitation out of the pipes, and retain the moisture until absorbed by the roots of the plants as required.

The above process is repeated so long as there is any water left in the reservoir. As the water in the reservoir D requires at least five or six days, even in hot weather—in other seasons upward of eight days—for total evaporation, it simply results that the plants may be left alone for a pretty long time without apprehending any harm, or they may be entrusted to the care of inexperienced domestics, who have simply to fill the reservoir.

Having thus described my invention, what I claim as new, and desire to secure by Letters Patent, is—

A flower-pot, constructed of the material, and as herein described, consisting of the pot B provided with one or more pipes, E, with openings F, and arranged within the pot A so as to create the compartment D, all constructed and operating substantially as set forth.

FERDINAND CARL AUGUST VON LEVETZOW.

Witnesses:
 LOUIS KRUEGE,
 ROBERT HERMANN.